Jan. 19, 1937.     L. E. WIRTH     2,068,120
VEHICLE BRAKE
Filed May 4, 1935     2 Sheets—Sheet 1
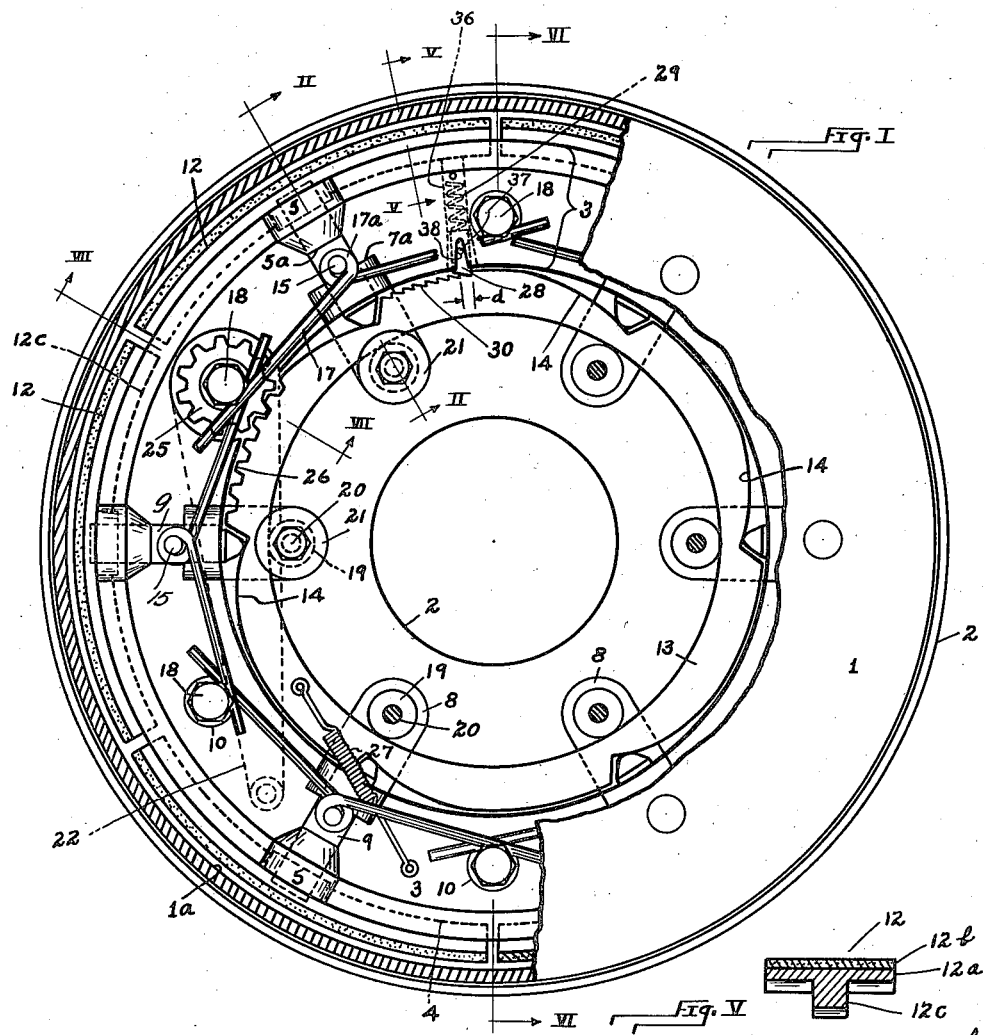
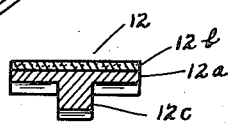
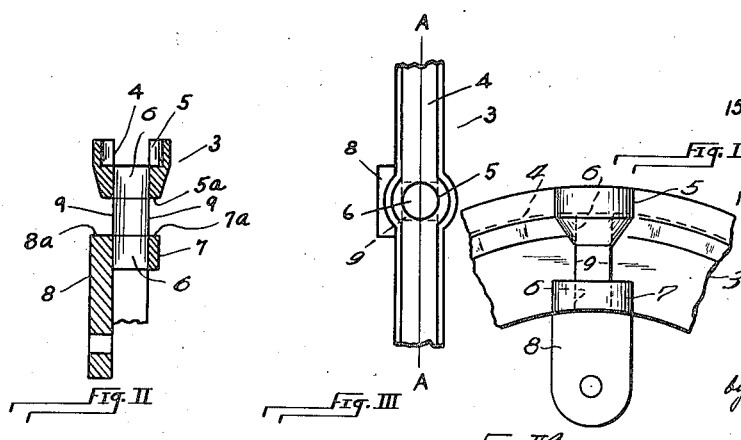
INVENTOR
Louis E. Wirth
by Christy and Wharton
attorneys

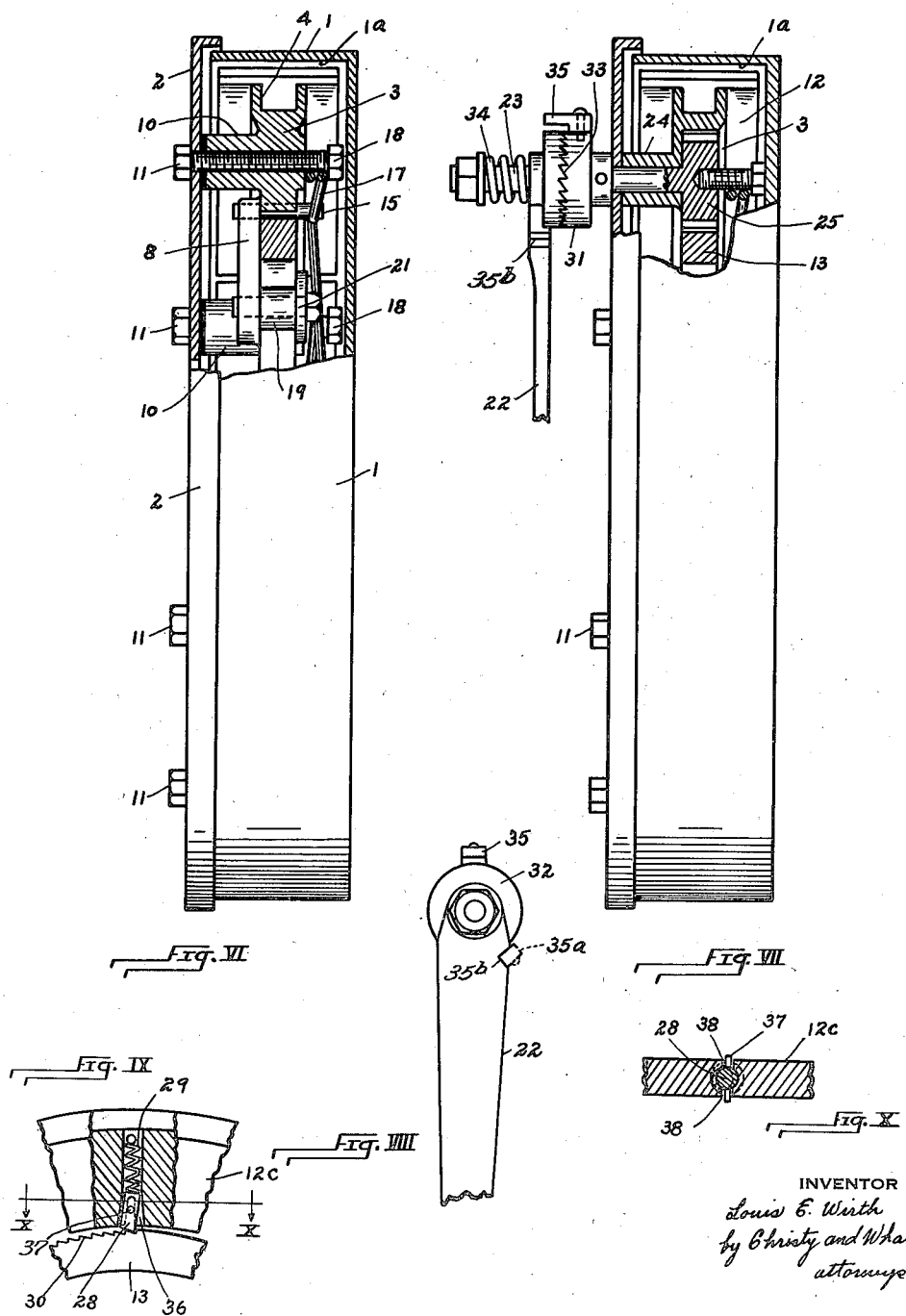

Patented Jan. 19, 1937

2,068,120

UNITED STATES PATENT OFFICE 2,068,120

VEHICLE BRAKE

Louis E. Wirth, Pittsburgh, Pa.

Application May 4, 1935, Serial No. 19,826

11 Claims. (Cl. 188—79.5)

My invention relates to a brake which, while of general utility where braking effect is desired, is particularly suited for use in motor cars.

An object of the invention is to provide a self adjusting brake, a brake which within certain limits is automatically adjustable to compensate for wear of the parts.

Another object is to provide a brake including a plurality of brake shoes, and means for operating the brake shoes to obtain uniform braking effect upon the whole of the effective surface of the brake drum.

Still another object is to provide a brake including radially operable brake shoes that are so organized as to be readily interchangeable and readily removable and replaceable for repair.

An embodiment of the invention is illustrated in the accompanying drawings. Fig. I is a view of the brake in side elevation, showing the brake drum broken away and revealing the brake elements that are organized within the drum.

Fig. II is a fragmentary, sectional view of the brake frame, the view being taken on the cross-sectional plane II—II of Fig. I.

Fig. IIa is a fragmentary, elevational view, corresponding to the showing of Fig. I, of the portion of the brake frame shown in section in Fig. II.

Fig. III is a fragmentary view, in plan from above, of the frame shown in Fig. II.

Figs. I and V are sectional views of a brake shoe, taken respectively on the planes II—II and V—V of Fig. I.

Fig. VI is a view of the edge of the brake drum, the drum, however, being broken away, and showing certain internal elements of the brake in section, on the plane VI—VI of Fig. I.

Fig. VII is a view comparable to Fig. VI, showing in section certain of the brake elements on the plane VII—VII of Fig. I.

Fig. VIII is a fragmentary view in side elevation of the brake-operating lever.

Fig. IX is a fragmentary detail view of the take-up assembly of the brake, and is taken in section in the plane of a cam ring forming an element of the brake.

Fig. X is a cross-sectional view taken in the plane X—X of Fig. IX.

The brake comprises a drum 1 which, according to familiar practice, is integrated with a traction wheel of the motor car to which it is applied. The drum, of course, revolves with the wheel to which it is secured. A backing plate 2 is secured in accordance with well-known practice to the axel housing (not shown) or to other non-rotating parts of the motor car's chassis. The operative elements of the brake include a brake frame 3, the frame 3 being an annulus of specialized structure. The outer periphery of annular frame 3 includes a continuous groove 4 which is enlarged at equal intervals to provide, in this case, six sockets 5.

A bore 6 extends radially through the frame 3 from each socket 5. At the radially inward ends of the bores 6, the frame 3 is reinforced on one side by bosses 7, while on the opposite side of the frame radially extending legs 8 are integrated. Between the edges 5a of the socket members and the edges 7a and 8a, respectively, of the bosses 7 and legs 8, the frame 3 is windowed; that is, windows 9 open through the opposite sides of the frame and into the bores 6, of Figs. I, II, and IIa.

Extending laterally from the frame 3, and between successive bores 6 in the frame, are bosses 10, each boss being drilled and internally threaded, as shown in Fig. VI. Machine screws 11 are projected through suitable holes in the backing plate 2 of the brake and screwed home in the several bosses 10; so, the brake frame 3 and the parts carried by it are rigidly united with the fixed backing plate. Brake elements are operatively associated with the frame 3, to be brought to play upon the inner face 1a of the brake drum, so that rotation of the drum, and the wheel which carries it, is retarded and braking effect is obtained.

Advantageously, I employ independently actuated brake shoes 12 as the means which are pressed into contact with the face 1a of the brake drum. In employing my brake shoes and in providing the shoe-operating mechanism, presently to be described, I obtain a uniform distribution of braking effect upon the entire face 1a of the drum. Of course, this is a desirable brake characteristic. In this case I employ six brake shoes, the brake shoes corresponding in number and relative position with the six bores 6. The brake shoes each comprise a thin arcuate body 12a, upon whose outer surface a facing 12b of brake lining material is secured. The body 12a is reinforced by a central rib 12c extending substantially the length of the body 12a, and, medially of the shoe, the rib 12c is enlarged, forming a boss 12d. A stem 12e is secured, conveniently by welding, in the boss 12d, and the stem is provided with a transverse bore 12f, cf. Fig. IV.

The brake shoes are assembled peripherally of the frame 3, the stem 12e of each shoe extending into one of the bores 6. The bosses 12d of the brake shoes nest in sockets 5 and the reinforcing ribs 12c of the shoes lie snugly in the groove 4 of the frame. Manifestly, the brake shoes are free for movement radially outward of the brake frame and into engagement with face 1a of the brake drum. It will be perceived, however, that within the permitted range of radial movement, the rib-and-groove engagement between the ribs 12c of the shoes and the groove 4 of frame 3 positively prevents the turning or chattering of the shoes, since the ribs 12c are not in braking movement of the shoes carried radially out of the grooves 4.

Immediately within the annular frame 3, I organize a ring 13; the outer edge of the ring includes a plurality of cam faces 14, corresponding in number and relative position to the stems 12e. The tips of the stems 12e each ride a cam face 14, and resilient means are provided to maintain such tips against the cam faces. Such means advantageously comprise (in the case of each stem 12e) a pin 15 which projects with sliding fit through the transverse hole 12f in the stem. The pin 15 is notched at 16, and the loop 17a of a wire spring 17 is fitted upon the end of the stem, which end in assembly projects from the window 9 of the bore 6 in which the stem is fitted. The loop of spring 17 bears into notch 16 of the pin, while the otherwise free ends of the spring 17 are sprung into position under a pair of machine screws 18, 18, secured in successive bosses 10, cf. Fig. VI. The tension of the spring in reacting upon pin 15 presses the stem 12e radially inward, and maintains the tip of the stem against its associated cam face 14.

The cam ring 13 is rotatably secured to the brake frame 3; that is to say, the legs 8 that are integrated with the frame 3 carry each a bearing roller 19. The bearing rollers 19 are each secured to the respective legs 8 by means of a screw 20, and a washer 21 is associated with each screw, laterally of the roller. Thus the cam ring 13 is laterally confined on one side by the legs 8 and on the opposite side by the washers 21, and only rotary movement of the ring is possible. A cam ring borne upon internal rollers in this manner is a structure making for maximum strength with minimum weight of the parts.

Upon referring to Fig. I, it will be observed that rotation of the cam ring in a clockwise direction will, by reason of the peculiarly shaped cam faces 14, cause the outward, radial movement of the stems 12e. Accordingly, the brake shoes are pressed into engagement with the drum 1 and braking effect is obtained.

The means for so rotating the cam ring comprise an arm 22 mounted upon shaft 23; the shaft 23 is trunnioned in a sleeve portion 24 integral with the frame 3 (Fig. VII), and carries a pinion 25 at its inner end. The cam ring 13 is provided with teeth 26, meshing with a pinion 25, and counterclockwise rotation of the pinion (Fig. I) will produce clockwise rotation of the cam ring, to force the stems 12e outward and to press the brake shoes into engagement with the drum face 1a. A tension spring 27 is secured at its opposite ends to the frame 3 and the cam ring 13, respectively. The spring 27 resists clockwise movement of the cam ring, and tends to maintain the parts in their normal, non-braking positions shown in Fig. I. The spring 27 also is instrumental in restoring the ring to its normal position upon the completion of a brake application.

It will be understood that the distal end of arm 22 is secured to a brake rod (not shown) of the motor car. The brake rod extends from the arm 22 to the hand lever or foot pedal of the motor car, and, according to familiar practice, the brake rod is organized with springs, to restore the parts to normal position after a brake application. That is to say, an operation of the brake controls (hand lever or foot pedal) will effect the counterclockwise swing of the arm 22 (Fig. I) and the turning of the cam ring 13, against the resistance of the spring 27. Braking effect is thus produced. Upon release of the controls, the brake rod thrusts the arm 22 back to its illustrated normal position, and the cam ring and brake shoes are restored to their ineffective position.

I provide means for the automatic adjustment of the brake, as during service the brake parts become worn. Such means include a detent pin 28 mounted in the frame 3. The cam ring 13 is notched or provided with several tapering teeth 30, and the detent 28 is backed by a spring 29 which urges the tapered tip of the detent into contact with one or another of the teeth 30 on the cam ring.

The detent pin, or pawl, 28 lies in the radially inward, belled region of the bore 36 in the frame, in which the spring 29 is housed. It is held against rotation about its longitudinal axis in the bore, by means of a cross pin 37 lying within downwardly flaring slots 38 (see Figs. I and X). Slots 38, because of their flaring contour, permit detent pawl 28 to move in the belled region of the bore 36, to assume different angular positions with respect to the longitudinal axis of the bore.

It will be noted in Fig. IX that the terminal, cam-contacting face of detent pawl 28 is of greater extent than the arcuate extent of each tooth, defined by the lines d in Fig. I, and that the pawl may oscillate to a limited extent in the bore 36. It should also be noted that, whereas the positioning and proportioning of the pawl 28, slots 38, teeth 30, and cam surfaces 14, are shown substantially as in the actual brake, the clearance between the lining on brake shoes 12, and the opposed surface of drum 1, is shown throughout the drawings as greatly exaggerated, for clearness of illustration. The braking means proper are such that movement of the cam need be but slight in order to apply the brake. This for the reason that a number of shoes having radial stems are used, so that the radial distance involved in a given travel of a stem over a rise of the cam causes an equal radial movement of the associated brake shoe.

The arcuate extent of each tooth, defined by the lines d, is so determined with respect to the rise of the cam faces 14 that the cam ring need normally be turned through an arc less than the distance d in order to bring the brake shoes into braking contact with the brake drum. When, however, the lining on the brake shoes becomes worn by repeated braking applications, there is an adjustment which brings the brake shoes, in their free or retracted positions, closer to the inner surface of the brake drum.

This adjustment is effected by a movement of the cam ring, which is increased beyond normal in arcuate extent, because of the increased distance through which the brake shoes must travel in order to make braking contact with the drum. Upon some such movement of the cam ring, the detent pawl 28 is passed by the tooth upon the face of which it has ridden, and assumes position rearwardly of the rise of that tooth. This gives a new starting position of the cam ring which places the terminals of stems 9 further up the slope of each of the cam faces 14, thus decreasing the distance through which the brake shoes move in a braking application.

Since the detent pawl 28 lies behind the tooth upon which it formerly rode, it would not be possible to release the brake if all the parts were rigidly mounted. The loose mounting of detent pawl 28 in bore 36 permits the pawl, however, to yield to a tendency to so oscillate about the axis of the bore as to follow the movement of the cam ring in both directions of rotation. As the detent pawl is carried with the cam ring, in its braking stroke, to the position in which it slips behind the tooth to make the take-up adjustment, it can oscillate to a perceptible extent to permit return movement of the cam ring adequate to release the brake. It should be emphasized that an extremely slight movement is adequate for that purpose.

In so determining the position of rest of the cam ring 13, I automatically compensate for wear of the parts. As a matter of convenience I term the automatic brake adjuster a "take-up" device. To insure that the cam ring will always have sufficient throw to operate the brakes, irrespective of the position of the cam ring as determined by the detent 28, I provide for take-up in the arm 22. That is, the arm 22 is not fixed immediately to the shaft 23 of the ring-turning pinion 25. A block 31 is secured to shaft 23, and a matching block 32 is integrated with the arm 22. The adjoining faces of these two blocks are formed with complementary teeth 33, and a spring 34 is organized on the shaft 23, to press the two blocks together, as shown in Fig. VII.

When, during the operation of the brake, the detent 28 functions as explained, to compensate or to adjust for wear of the parts, the cam ring does not return to its former starting position and neither does the pinion 25 and shaft 23. In the connection (31, 32) of the arm 22 to the shaft 23, however, I provide for take-up of the arm 22, to the end that the range of swing of the arm (22) and the accompanying range of turning of the pinion 25 will be maintained constant. More specifically, when the detent 28 operates to prevent the return of the cam ring 13 to its former starting position, the pinion and shaft 25, 23, manifestly, are positively held from returning to the position from which they started. However, the operation of the brake rod or brake-controlling mechanism (not shown) throws the arm 22 back to its absolute initial position, the spring 34 yielding and permitting passage of the teeth on block 32 over the teeth on block 31. The pinion-turning range of swing of the arm 22 is thus maintained constant.

The block 31 carries a stop 35, and, when several take-up adjustments of the detent 28 have occurred, together with the complementary adjustments of the arm 22 on shaft 23, the stop 35 will come to abutment with the arm, as shown by dotted lines 35a in Fig. VIII. Desirably, but not necessarily, arm 22 has therein a notch 35b arranged to receive lug 35 in the dotted-line contact position 35a of the lug and arm shown in Fig. VIII. When the stop 35 so abuts the arm 22, it will be perceived that further take-up of the arm on the shaft is prevented. When this condition of the parts prevails, a subsequent take-up actuation of the detent 28 on the cam ring 13 will not be accompanied by a take-up adjustment of the arm 22, the stop 35 preventing the arm 22 from swinging back to its initial position. Accordingly, the hand lever, foot pedal, or other brake controls, are not restored to "off" position. When this condition obtains, the driver will know that the brake is worn to the point of danger and that brake repair should be made. While the brake controls are in this manner hampered, to serve as notice to the operator of the motor car, sufficient play is left in the controls, to enable continued service of the brake until ultimate or complete brake failure occurs. Desirably, the stop 35 is so arranged that the described condition occurs before the brake lining has become worn to such degree that braking movement of the brake shoes carries their ribs out of the grooves of the brake frame, due to the necessity for abnormal brake shoe travel.

I have provided a brake of such structure that the parts may be readily produced by forging. Manifestly, the bodies of the shoes 12 can be drop-forged, and the stems 12e spot-welded to them. The brake frame 3 is adapted to be drop-forged in two halves, indicated by the line A—A in Fig. III, and the halves then welded together.

To repair the brake, I remove the traction wheel of the car to which the brake drum (1) is secured. The brake shoes then are accessible to the mechanic; he merely "jacks" the springs 17 free from the pins 15, withdraws the pins from stems 12e, and the shoes 12 are then freed for removal. The shoes may be refaced with brake lining, or new shoes may be installed, the whole operation being quickly performed and requiring no highly specialized mechanic to do the job.

This constitutes a continuation in part of application Serial No. 609,806, filed May 7, 1932.

I claim as my invention:

1. In a brake, a brake frame, a drum concentric with the brake frame and a member for braking engagement with the drum, an approximately circular cam rotatable in one direction to move said member into braking engagement and rotatable in the opposite direction to release said member from braking engagement, mechanism for rotating said cam in both directions, a toothed region on said cam, and a detent pin loosely mounted in a bore of the brake frame adjacent the toothed region of the cam and yieldingly forced into contact with the toothed region of the cam cooperatively therewith to limit movement of the cam in brake-releasing direction, said detent pin adapted to assume a changed position with respect to the several teeth of said toothed region of the cam upon increased movement of the cam in braking direction to vary the limitation to brake-releasing movement of the cam.

2. A brake in accordance with the combination of claim 1 in which the mechanism for rotating the cam comprises a take-up device arranged to accommodate the action of said mechanism in accordance with varied limitation to brake releasing movement of the cam.

3. A brake structure including a brake drum, a circular brake frame provided with a peripheral groove, a plurality of segmental brake shoes formed severally on a common radius approximating that of the brake drum, bores extending through said brake frame radially of the assembly, each of said brake shoes having a rib adapted to lie in said groove and a stem adapted to lie in one of said bores, and means cooperative with said stems operable to force the stems and their associated brake shoes simultaneously radially outward.

4. A brake structure in accordance with claim 3 in which the operable means cooperative with the brake shoe stems are adapted to move the stems radially a maximum distance less than the distance which the brake-shoe ribs extend into the peripheral groove of the frame.

5. A brake structure including a brake drum, a circular brake frame provided with a peripheral groove, a plurality of segmental brake shoes formed severally on a common radius approximating that of the brake drum, bores extending through said brake frame radially of the assembly, each said brake shoe having a rib adapted to lie in said groove and a stem adapted to lie in one of said bores, and a rotatable cam ring having thereon cam surfaces arranged each to act directly upon the radially inward terminal of a stem to move the brake shoe associated therewith radially outward into braking engagement with the drum.

6. A brake structure including a brake drum, a circular brake frame having therethrough a plurality of bores disposed radially of the assembly, a plurality of brake shoes formed severally on a common radius approximating that of the brake drum, each said brake shoe having a stem lying in and guided by one of said bores, a cam ring rotatable in opposite directions and having thereon cam surfaces arranged each to act directly upon the radially inward terminal of one of the stems to move the shoe associated therewith radially outward into braking engagement with the drum upon rotation of the cam ring in braking direction, and a detent arranged to limit movement of the cam in the opposite brake-releasing direction, thereby limiting the braking movement of the cam necessary to bring the brake shoes into braking engagement with the drum.

7. A brake structure including a brake drum, a circular brake frame provided with a peripheral groove, a plurality of segmental brake shoes formed severally on a common radius approximating that of the brake drum, bores extending through the brake frame radially of the assembly, each of said brake shoes having a rib adapted to lie in said groove and a stem adapted to lie in one of said bores, a cam ring rotatable in opposite directions and having thereon cam surfaces arranged each to act directly upon the radially inward terminal of one of the stems to move the shoe associated therewith radially outward into braking engagement with the drum upon rotation of the cam ring in braking direction, and a detent arranged to limit movement of the cam in the opposite brake-releasing direction, thereby limiting the braking movement of the cam necessary to bring the brake shoes into braking engagement with the drum, radial movement of the brake shoes under rotation of said cam ring in braking direction being inadequate to move the ribs of the brake shoes from the groove of the brake frame.

8. A brake structure in accordance with the combination of claim 6 in which the detent is a pin lying loosely within a bore in the brake frame and held yieldingly in position cooperatively to contact a region of the cam ring, the cam ring being toothed in the said region contacted by the detent pin.

9. A brake structure in accordance with the combination of claim 7 in which the detent is a pin lying loosely within a bore in the brake frame and held yieldingly in position cooperatively to contact a region of the cam ring, the cam ring being toothed in the said region contacted by the detent pin.

10. In a brake structure the combination of a brake drum, a concentric brake frame, a plurality of segmental brake shoes mounted for radial movement on said brake frame and having contact elements extending radially inward of the brake frame, a concentric cam ring having thereon cam faces arranged cooperatively to contact each the contact element of one of the brake shoes, said cam ring having a toothed region thereon, said cam ring being movable oppositely in braking direction and brake-releasing direction, and a detent pin loosely mounted in a bore of the brake frame to contact the said toothed region of the cam ring and as presented to the teeth thereof to limit movement of the cam ring in brake-releasing direction.

11. In a brake structure the combination of a brake drum, a concentric brake frame, a plurality of segmental brake shoes mounted for radial movement on said brake frame and having contact elements extending radially inward of the brake frame, a concentric cam ring having thereon cam faces arranged cooperatively to contact each the contact element of one of the brake shoes, said cam ring having a toothed region thereon, said cam ring being movable oppositely in braking direction and brake-releasing direction, mechanism for rotating said cam in both directions, a detent pin loosely mounted in the bore of the brake frame to contact said toothed region of the cam ring and as presented to the teeth thereof to limit movement of the cam ring in brake-releasing direction, said detent pin adapted to assume a changed position with respect to the several teeth of said toothed region of the cam upon increased movement of the cam in braking direction to vary the limitation to brake-releasing movement of the cam, and a take-up device arranged to accommodate the action of the cam-rotating mechanism in accordance with varied limitation to brake-releasing movement of the cam.

LOUIS E. WIRTH.